Jan. 7, 1958 R. R. YOST, JR., ET AL 2,819,454

INDUCTOR DESIGN

Filed May 31, 1955

INVENTOR.
Russel R. Yost, Jr.
Robert C. Lockwood
BY [signature]
[signature]
ATTORNEYS United States Patent Office 2,819,454

Patented Jan. 7, 1958

2,819,454

INDUCTOR DESIGN

Russell R. Yost, Jr., Phoenix, Ariz., and Robert C. Lockwood, Long Beach, N. Y., assignors, by mesne assignments, to the United States of America as represented by the Secretary of the Navy Application May 31, 1955, Serial No. 512,341

3 Claims. (Cl. 336—87)

The present invention relates to a novel and improved variable inductor and more particularly to a novel and improved variable inductor having a relatively wide tuning range and capable of providing an extremely low minimum value of inductance.

In many applications for relatively high frequency radio and electronic apparatus inductors having very low minimum inductive impedance characteristics are often essential to proper operation of the equipment. It is also often necessary and desirable that inductors of this type have at the same time a relatively wide and sensitive tuning range. Although many types of variable inductors have been designed and used in the past to satisfy such requirements, considerable difficulty has been experienced heretofore in providing an inductor of this kind which is relatively simple in construction and highly efficient in operation.

It is a principal object of the present invention to provide a novel and improved variable inductor which is capable of presenting a very low minimum inductance.

It is a further object of the present invention to provide a novel and improved variable inductor which exhibits a relatively small change in capacitance to ground as it is varied.

It is a further object of the present invention to provide a novel and improved variable inductor which has a relatively wide and sensitive tuning range and a relatively small minimum value of inductance.

Other objects and many of the attendant advantages of this invention will be readily appreciated as the same becomes better understood by reference to the following detailed description when considered in connection with the accompanying drawings wherein.

In general, the improved variable inductor of the present invention includes a dielectric element, an electrically conductive helical coil imbeded in the dielectric element, and means adjustably disposed between the dielectric element and the coil for providing a low impedance electrical path therebetween. It has been found that such an inductor provides an exceptionally low minimum value of inductance without materially reducing its effective tuning range.

Figures 1, 3:
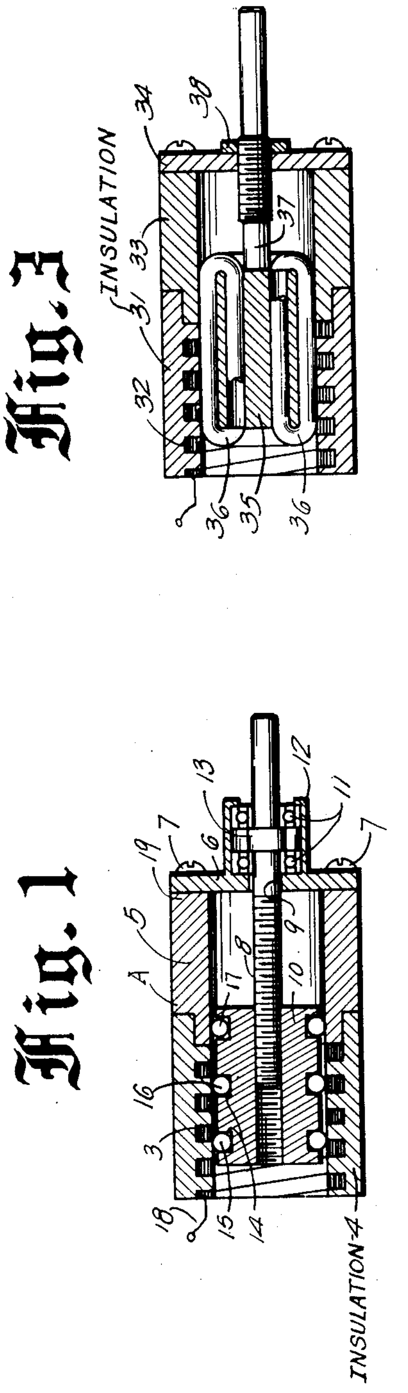
Figure 1 is a cross-sectional view of one preferred embodiment of the present invention.
Figure 3 is a cross-sectional view of another preferred embodiment of the present invention.

A preferred embodiment of the present invention is illustrated in Figure 1 of the drawing. As shown therein, the helical inductance coil 3 is secured in any suitable manner in the preformed rectangular grooves of the tubular dielectric sheath or the like 4. The inner surface of the helical coil 3 is preferably machined as shown substantially flush with the inner surface of the sheath 4. The tubular metallic case or the like 5 is preferably coaxially secured in any suitable manner to one extremity of the sheath 4. The extremity of the case or the like 5 remote from the sheath is preferably enclosed by the end plate member or the like 6 and is secured to the plate member in any suitable manner such as by means of the cap screws 7 shown in the drawing. The shaft 8 which passes through the aperture 9 in the end plate member threadedly engages the metallic cylindrical plunger or the like 10 which has an outside diameter that is slightly less than the bore diameter of the sheath 4 and the case 5 so as to allow the plunger to slide properly therewith. The bearing members or the like 11 which are of any suitable conventional design and which are positioned in a spaced axial relation on the support structure 12 attached to the end plate 6 cooperate with the rectangular lug or the like 13 on the shaft to prevent axial movement of the shaft and to permit adjustment of the plunger 10 in the bore of the sheath 4 and the case 5. The annular rectangular grooves 14 in the peripheral surface of the plunger 10 accommodate the hardened silver coil spring brush elements or the like 15, 16, and 17 and as will be more apparent hereinafter provide continuous effective electrical contact of the inner surface of the sheath 4 and the case 5 with the plunger 10. As shown in the drawing, the brush elements 15 and 17 are preferably disposed adjacent opposite extremities of the plunger 10, whereas at least one brush element 16 is positioned therebetween in order to suppress and minimize undesired electrical resonances. The electrical terminals whereby the improved inductance coil of the present invention is electrically connected to any suitable electronic circuit or the like are preferably positioned at 18 and 19 respectively adjacent one extremity of the sheath 4 and one extremity of the metallic case 5.

It is to be understood that the material from which the sheath 4, the shaft 8, and the shaft bearing assembly are preferably constructed may be selected from any suitable group of electrically non-conductive materials such as the various well known types of plastic dielectrics and the like without departing from the spirit or scope of the present invention. Similarly the material for the case 5, the plunger 10, and the brush elements 15, 16 and 17 may be selected from any suitable group of highly conductive materials without departing from the spirit or scope of the invention.

In operation when the shaft 8 occupies its inserted position the entire extent of the helical coil 3 is shorted out through a path that includes the brush element 15, the plunger 10, the brush element 17, and the metallic case 5. As the shaft 8 is rotated, the plunger 10 is withdrawn farther into the bore of the sheath 4 and the case 5, and successive turns of the helical coil are removed from the shorting effect of the plunger and a step by step increase in the size of the inductance of the coil is obtained.

It has been found that the above described device provides a very low and stable minimum inductance due to the elimination of flexible leads, long spring wipers and the like. Thus, at its minimum inductance setting, the inductance of the described device consists principally of the plunger and the case which may be approximately an inch in diameter. In some applications for the device a high frequency ground can be established at the point A on the case thereby still further reducing the value of the minimum inductance.

For applications where neither end of the helix can be maintained at the high frequency ground potential, the variation of distributed capacitance to ground is effectively reduced by the fact that the case acts as a shield into which the plunger is withdrawn as the inductance is increased. One such application for the variable inductance is diagrammatically shown in Figure 2 of the drawing. In this circuit the capacitance to ground of the case forms part of $C_L$ and the fact that this capacitance does not vary is often of considerable value.

A modified embodiment of the present invention is shown in Figure 3 of the drawing. As shown therein, the sheath 31, the helical coil 32, the case 33 and the end plate 34 are for all practical purposes identical with the above described embodiment of the invention. The plunger 35, however, is provided preferably with four longitudinally oriented slots or grooves to accommodate the single turn coil spring brush elements 36. For reasons that will be more apparent hereinafter the ends of the brush elements 36 remote from the case 33 are staggered so that they line up with a turn of the helical coil 32. The shaft 37 is fixedly secured to the plunger 35 and threadedly engages the threaded aperture and boss 38 in the end plate 34. In this way the plunger together with the longitudinally oriented brush elements 36 rotate in the bore of the sheath and the case as it moves axially and thereby provide a continuous increase or decrease in inductance rather than the step by step variation of the above described embodiment of Figure 1.

Figures 2, 4:
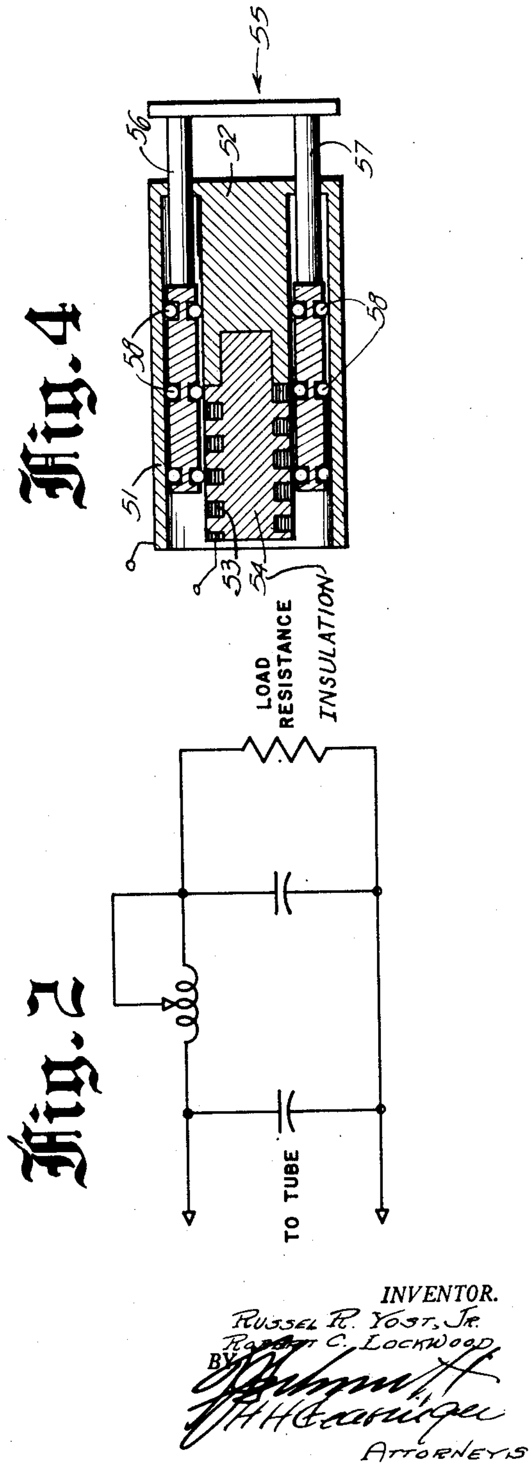
Figure 2 is a diagrammatic view of one electrical application of the embodiment of the invention shown in Figure 1.
Figure 4 is a cross-sectional view of still another preferred embodiment of the present invention.

Another embodiment of the invention is illustrated in Figure 4 of the drawing. As shown therein, the metallic electrically conductive case is provided with the part metallic and part dielectric axial core 52. The helical coil 53 is embedded in the preformed rectangular grooves of the dielectric sheath 54 such that the outer peripheral surface of the coil is flush with the outer surface of the sheath. The plunger assembly 55 of this embodiment of the invention includes the metallic shaft members 56 and 57 and the coil spring brush elements or the like 58 which short out the various turns of the helical coil 53 to the case 51.

In operation as the plunger assembly 55 of this embodiment is moved within the case 51 successive turns of the helical coil 53 are effectively inserted in or removed from the circuit in which the inductor is to be used. It is to be noted that in this embodiment of the invention the return path through the brush elements 58 and the case 51 becomes shorter as the plunger is advanced into the bore of the case. In this way the minimum inductance is still further reduced without a reduction of the length of the helical coil 53 and the overall range of inductance variation.

Obviously many modifications and variations of the present invention are possible in the light of the above teachings. It is therefore to be understood that within the scope of the appended claims the invention may be practiced otherwise than as specifically described.

What is claimed is:

1. A variable inductor comprising a tubular electrically conductive case having an enclosed extremity and a coaxial core integral therewith, one portion of said core being electrically conductive and one portion thereof being electrically non-conductive; an electrically conductive helical coil imbedded in the non-conductive portion of the core such that the exterior surface of the coil is substantially flush with the exterior surface of the core; and means adjustably disposed between the peripheral surface of the core and the interior of the case for providing a low impedance electrical path therebetween.

2. A variable inductor comprising a tubular electrically conductive case having an enclosed extremity and a coaxial core integral therewith, one portion of said core being electrically conductive and another portion thereof being electrically non-conductive; an electrically conductive helical coil imbedded in the non-conductive portion of the core such that the exterior surface of the coil is substantially flush with the exterior surface of the core; an electrically conductive plunger disposed between the peripheral surface of the core and the interior of the case; and means for adjustably positioning the plunger within the case.

3. A variable inductor comprising a tubular electrically conductive case having an enclosed extremity and a coaxial core integral therewith, one portion of said core being electrically conductive and another portion thereof being electrically non-conductive; an electrically conductive helical coil imbedded in the non-conductive portion of the core such that the exterior surface of the coil is substantially flush with the exterior surface of the core; an electrically conductive plunger disposed between the peripheral surface of the core and the interior of the case; electrically conductive coil spring brush elements positioned about the periphery of the plunger, said brush elements being adapted to provide a low impedance electrical path between the coil and the case through the plunger; and means for adjustably positioning the plunger within the case.

References Cited in the file of this patent

UNITED STATES PATENTS

| | | |
|---|---|---|
| 1,904,208 | Dow | Apr. 18, 1933 |
| 2,030,369 | Heintz | Feb. 11, 1936 |
| 2,523,896 | Bartolomei | Sept. 26, 1950 |